Jan. 27, 1959     A. KEEL     2,870,746
SERVO CONTROL FOR POWER TRANSMISSION
Filed Nov. 19, 1954     2 Sheets-Sheet 1

INVENTOR.
ADOLF KEEL
BY
Ralph L. Tweedale
ATTORNEY

Jan. 27, 1959  A. KEEL  2,870,746
SERVO CONTROL FOR POWER TRANSMISSION
Filed Nov. 19, 1954  2 Sheets-Sheet 2

*INVENTOR.*
ADOLF KEEL
BY
*Ralph L. Tweedale*
ATTORNEY

2,870,746
SERVO CONTROL FOR POWER TRANSMISSION

Adolf Keel, Highland Park, Mich., assignor to Vickers Incorporated, Detroit, Mich., a corporation of Michigan Application November 19, 1954, Serial No. 469,934

2 Claims. (Cl. 121—41)

This invention relates to power transmissions, and is particularly applicable to those of the type comprising two or more fluid pressure energy translating devices, one of which may function as a pump and another as a fluid motor.

More particularly the invention relates to a servo controlled variable displacement fluid pressure energy translating device for use in such a transmission.

In systems utilizing such devices, extremely precise control of displacement is often required. The displacement variation must instantaneously and directly follow the controlling input signal. Lost motion, with consequent "over-running" and "hunting" is a troublesome problem in such systems.

It is an object of this invention to provide an improved, low cost servo control for the displacement of a variable displacement fluid pressure energy translating device.

More particularly it is an object to provide such a control which is highly sensitive and not subject to "hunting" and "over-running" due to lost motion in the various components.

Further objects and advantages of the present invention will be apparent from the following description, reference being had to the accompanying drawings wherein a preferred form of the present invention is clearly shown.

Figure 1:
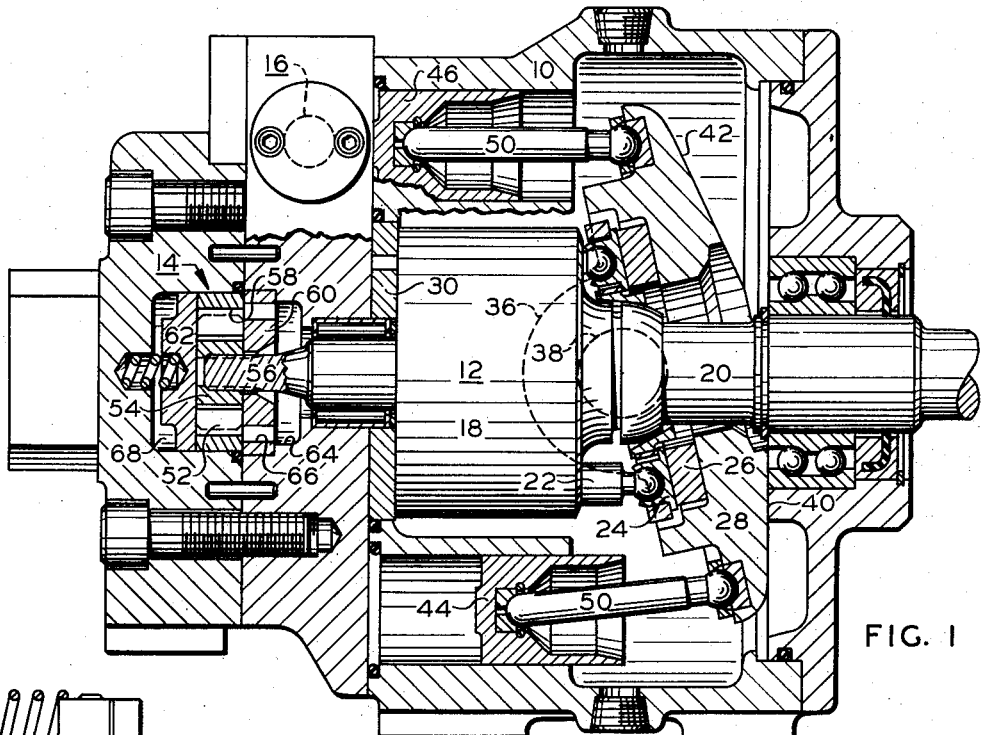
Figure 1 is a longitudinal section through a variable displacement pump embodying the present invention.

Referring now to Figure 1, the preferred embodiment there illustrated includes a body 10 which houses rotary pumping mechanism generally designated 12, a control pump generally designated 14, and servo control mechanism generally designated 16.

Pumping mechanism 12 is of conventional rodless design and includes a cylinder barrel 18 supported on a drive shaft 20. Cylinder barrel 18 includes the usual plurality of cylinder bores, each of which has a piston 22 extending therefrom. For the sake of clarity of illustration, only two of the pistons 22 are shown. Pistons 22 have at their outer ends shoes 24 which contact a wear plate 26 carried by a swash plate member 28. When cylinder barrel 18 is rotated by shaft 20, pistons 22 move in and out in their bores on alternating discharge and suction strokes. The in and out movement of the pistons is induced by departure from perpendicularity between the face of wear plate 26 and the axis of rotation of cylinder barrel 18.

The customary valve plate 30 is provided with the usual kidney-shaped ports, not shown, which establish properly phased communication between the cylinders of barrel 18 and external connection ports 32 and 34.

Figure 2:
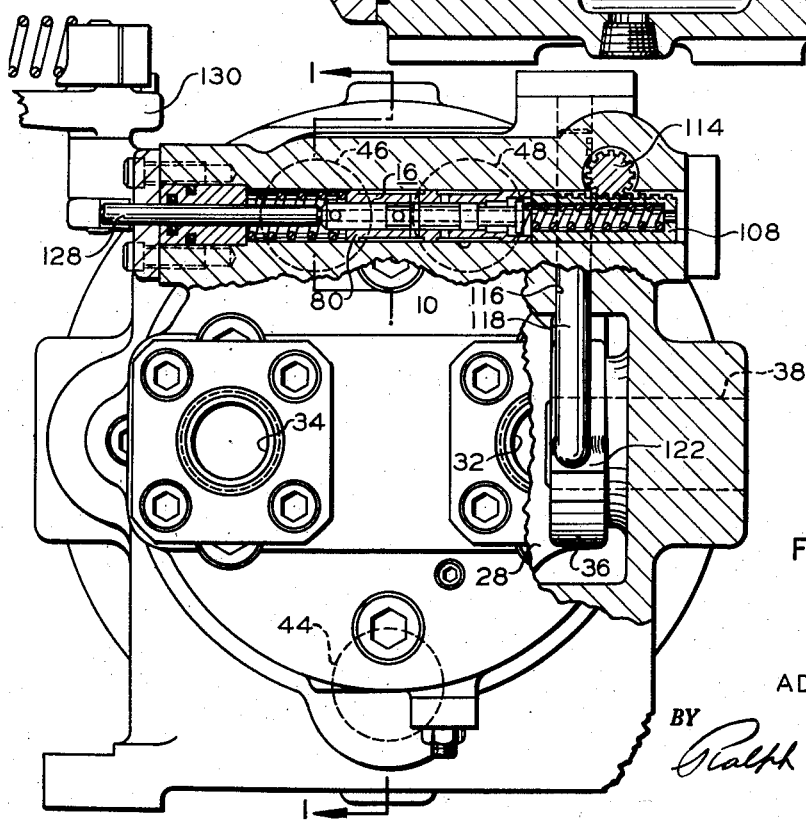
Figure 2 is an end elevation partially in section of the pump of Figure 1.

The swash plate 28 includes a pair of arms 36 positioned at opposite sides of the pumping mechanism 12. Arms 36 are pivotally supported in the housing 10 on pintles 38. The displacement of the pumping mechanism is infinitely variable from zero to a reversible maximum by tilting the swash plate 28 from a position of perpendicularity with the axis or cylinder barrel 18, wherein the displacement is zero, to a maximum displacement position at either side of the zero displacement position. In Figure 1 the pumping mechanism has been illustrated as being in one maximum displacement position wherein the face 40 of swash plate 28 abuts housing 10. The maximum displacement position for reversed flow is established by abutment of the face 42 of the swash plate 28 with housing 10. Assuming clockwise rotation as viewed in Figure 2 and swash plate disposition as shown in Figure 1, port 34 will be a discharge port and port 32 will be an inlet port. When swash plate 28 is shifted across the zero displacement center position, port 34 becomes inlet and port 32 becomes discharge.

The hydraulic pressure on the pistons 22 which is generated by the pumping action causes a heavy thrust load on the swash plate 28. Assuming frictionless abutment between shoes 24 and wear plate 26, the thrust exerted on wear plate 26 will be normal to its face. The axial and radial components of this thrust vary as the tangent of the swash plate angle. Since the maximum displacement position of swash plate 28 is limited to much less than a forty-five degree departure from perpendicularity, the axial component of thrust thereon will always exceed the radial component.

Swash plate 28 is shifted to vary the displacement of the pumping mechanism by the power section of the servo system which includes a plurality of control pistons 44, 46, and 48 which are translatable in bores in the housing 10. Only control pistons 44 and 46 are shown in Figure 1. The disposition of piston 48, adjacent piston 46, can be seen in Figure 2. The control pistons 44, 46, and 48 are connected to the swash plate 28 through a plurality of connecting rods 50. Note that rods 50 are mounted to transmit thrust only, and are ineffective in tension. As will be hereinafter seen, forces in the servo system are all unidirectional. Fluid pressure exerted on piston 44 tends to move the swash plate to the maximum position illustrated in Figure 1. The two control pistons 46 and 48 act in concert to shift the swash plate 28 in a direction opposite to that in which it is urged by piston 44. The control pistons 44, 46, and 48 may all be of the same diameter. Should equal pressures be imposed and maintained on all three control pistons, the swash plate 28 would move across the zero displacement center position to the maximum displacement position opposite to that shown in Figure 1.

Control pistons 44, 46, and 48 are so disposed that the rods 50 are substantially parallel to the pistons 22. Further, the disposition of piston 44 and pistons 46 and 48 at opposite sides of the pivotal axis of swash plate 28 creates a "first-class" beam system wherein the opposing forces always act in the same direction on the beam, or swash plate 28. Thus, thrust forces exerted on swash plate 28 by the control pistons will have major components parallel to, and in the same direction as, the axial component of the thrust due to the pistons 22. This arrangement minimizes lost motion and play in the pivotal mounting of the swash plate.

The control pump 14 is of the conventional type having a plurality of vanes 52 which are radially slideable in a rotor 54, which is supported on an extension 56 of drive shaft 20. A generally elliptical cam ring 58 encircles the rotor and vanes. A wear plate 60 abuts one side of the rotor and vanes, and a pressure plate 62 abuts the opposite side. Passage means, not shown, connect the chamber 64 to a source of hydraulic fluid. In the schematic circuit of Figure 4 a tank 65 serves as a fluid source and is connected to pump 14 by passages indicated at 67. Fluid from chamber 64 is drawn through inlet ports 66 in wear plate 60 to pumping zones formed between the rotor and the cam ring and is discharged to a pressure chamber 68 through the usual ports, not shown, in pressure plate 62.

Figure 4:
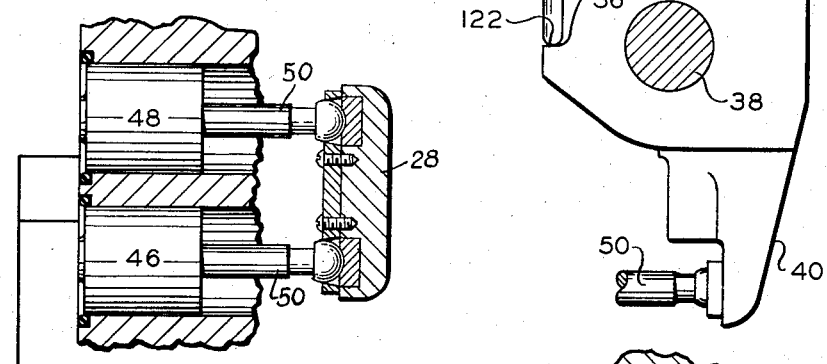
Figure 4 is a schematic showing of the hydraulic control system and includes an enlarged view of the valve sectionally shown in Figure 2.
Figure 4:
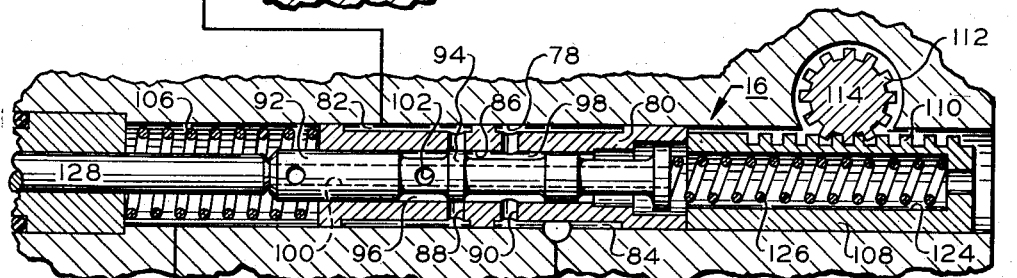
Figure 4:
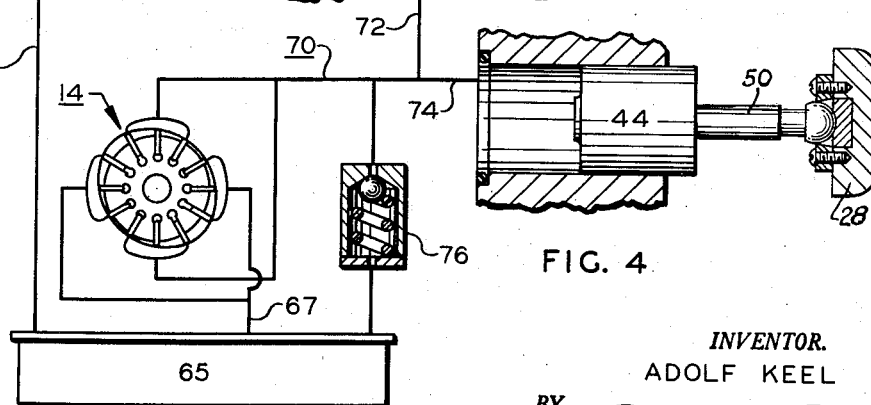

Fluid discharged by pump 14 into pressure chamber 68 is conducted through passages, not shown, in body 10 to the servo valve 16 and the control piston 44. These passages are generally indicated at 70 in the schematic circuit of Figure 4 and include a branch 72 extending to the servo valve and a branch 74 extending to control piston 44. A relief valve 76, shown schematically in Figure 4, is also incorporated in the body 10 and regulates the pressure developed by control pump 14.

The servo valve 16 includes a valve bore 78 having a sleeve 80 slideable therein. The sleeve 80 has a pair of cannelures 82 and 84 therein. Conduit 72 continuously communicates with cannelure 84 and a conduit 85 continuously communicates with cannelure 82 and extends to the control pistons 46 and 48. The cannelures 82 and 84 are connected to a central valve bore 86 in sleeve 80 by a pair of radially extending passages 88 and 90, respectively. A servo valve spool 92 is axially slideable in the bore 86 in sleeve 80. Spool 92 includes a land 94 which, in the position illustrated, blocks the passage 88 and which on rightward shifting of the valve relative to the sleeve establishes communication between passage 88 and a cannelure 96 and on leftward shifting establishes communication between the passage 88 and a second cannelure 98. In the center position, land 94 and passage 88 preferably have a line-to-line relation. The valve spool 92 has a central vent passage 100 extending therethrough which is intersected by a cross-passage 102 in the region of cannelure 96. Passage 100 is vented to the system reservoir through a passage indicated at 104.

It can be seen that the operating pressure of control pump 14 will continuously be conducted through conduit 70 and branch 74 so as to act on the control piston 44. Further, with the sleeve 80 and the valve member 92 in the relative positions illustrated, the control motors 46 and 48 will be isolated both from the reservoir and from the outlet of control pump 14. On rightward shifting of spool 92 relative to sleeve 80, the control pistons 46 and 48 will be vented to the reservoir, while on leftward shifting of spool 92 relative to sleeve 80, control pump outlet will be applied to control pistons 46 and 48. As was heretofore noted, the combined areas of control pistons 46 and 48 exceed the area of control piston 44; thus, leftward shifting of spool 92 will cause shifting of yoke 28 against the continuous biasing force exerted by control piston 44.

Figure 3:
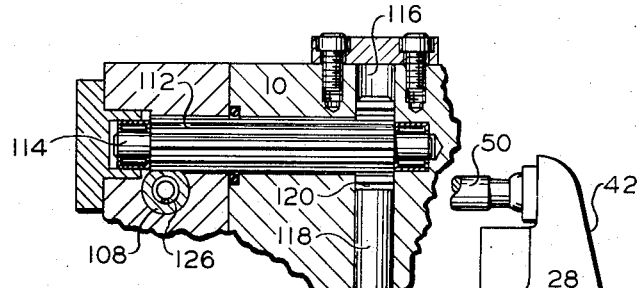
Figure 3 is a fragmentary view of part of the displacement varying mechanism and shows the swash plate of the device in the zero displacement condition.

The control effected by valve 16 is of the follow-up type and is completely free of lost motion. The feedback section of the servo control includes a spring 106 which continuously biases the sleeve 80 into abutment with a plunger 108 having a gear rack 110 thereon. The rack 110 meshes with the teeth 112 on a cross-shaft 114 which is rotatably journaled in housing 10. Shaft 114 extends into the body 10, as can be seen in Figure 3, to intersect a bore 116 having a rod 118 therein. The rod 118 includes a rack 120 which meshes with the extended teeth 112 on shaft 114. Rod 118 protrudes downward into the central chamber of body 10 to contact an abutment 122 on one of the swash plate arms 36.

It will be seen that the biasing force of spring 106 acts on sleeve 80 and is transmitted through the plunger 108 and shaft 114 to continuously urge the rod 118 into positive engagement with the abutment 122 on the swash plate 28. Sleeve 80 will thus partake of movements of swash plate 28.

The plunger 108 includes a central bore 124 having positioned therein a spring 126. Spring 126 functions to eliminate lost motion from the input section of the servo control. The spring 126 acts against the valve spool 92 and continuously urges spool 92 leftwardly relative to the sleeve 80. Note also that the spring 126 shifts with plunger 108, and the load of spring 126 reacts on the plunger 108 so as to aid spring 106 in biasing pin 118 into continuous abutment with swash plate 28. A control rod 128 extends into the valve bore 78 to contact the end of valve spool 92 for the purpose of shifting spool 92 against the biasing force of spring 126. A control lever arm 130 is provided for the application of an input signal force to the outer end of rod 128 to permit shifting spool 92 against spring 126 to control the displacement of pumping mechanism 12. Very small movement of spool 92 relative to sleeve 80 is required for displacement control. Thus the force exerted on spool 92 by spring 126 will remain substantially constant.

In operation, the drive shaft 20 will conjointly drive the pumping mechanism 12 and the control pump 14. As heretofore noted, the discharge pressure of control pump 14 is continuously exerted against the control piston 44, thus tending to move the swash plate 28 to the position shown in Figure 1. The spring 126 reacts against plunger 108, cross-shaft 114, pin 118, and abutment 122 to continuously urge the valve spool 92 leftwardly relative to the sleeve 80. If the control force exerted on rod 128 is less than force exerted by spring 126, the spool 92 will shift under the influence of spring 126 porting control pressure to the two control pistons 46 and 48 and causing shifting of swash plate 28. The resulting movement of swash plate 28 is fed back to the sleeve 80 through pin 118, cross-shaft 114, and the plunger 108. This feedback, or follow-up, action of sleeve 80 will neutralize the valve 16 and thus terminate the shifting of swash plate 28 at a point corresponding to the new position of the valve spool 92.

Similarly, when the swash plate 28 is in a position other than that illustrated, rightward movement of valve spool 92, induced by application of a force through rod 128 in excess of that exerted by spring 126, will vent the two control pistons 46 and 48, thus permitting the continuous pressure on control piston 44 to shift swash plate 28 toward the maximum displacement position illustrated. The continuous biasing force exerted by spring 106 acts through sleeve 80, plunger 108, and cross-shaft 114 on the pin 118, thus insuring that pin 118 follows the movement of swash plate 28. The resulting rightward follow-up movement of sleeve 80 neutralizes valve 16 when swash plate 28 has moved to a position corresponding to the new position of valve spool 92.

Note that in the power section, the biasing force exerted on swash plate 28 by piston 44 is a unidirectional, continuous one which reacts against a modulated unidirectional force exerted by pistons 46 and 48. There is thus no reversal of force in the power section, only a change in net force. Backlash in the power components of the servo control is thus eliminated. Further, the feedback section biasing force exerted by spring 106 in inducing the follow-up action of sleeve 80 is unidirectional, continuous, and eliminates all backlash from the follow-up system. The input section biasing force of spring 126 reacting against spool 92 is continuous and is resisted by a unidirectional control force applied through the control rod 128, the magnitude of which control force is varied to change the net force on spool 92 and thus control the shifting of spool 92.

Thus, the displacement of the device can be varied from maximum in one direction to a maximum in the other direction by a control signal applied through the lever arm 130 to the control rod 128, which signal varies in magnitude only, the direction remaining constant and opposed to the force of spring 126. Further, the feedback action is effected by a continuous, unidirectional force exerted by the spring 106 and acting through sleeve 80, plunger 108, shaft 114, to bias pin 118 against the swash plate 28. In addition, the piston 44 continuously biases the swash plate 28 toward the position illustrated in Figure 1, reacting against modulated force produced by the pistons 46 and 48. The entire servo system is thus maintained free from backlash.

There has thus been provided an improved servo control for varying the displacement of a fluid pressure energy translating device, which control is extremely sensitive and stable. Further, the improved control system has been achieved through the use of low cost and rugged parts which insure long, trouble-free operation.

While the form of embodiment of the invention as herein disclosed constitutes a preferred form, it is to be understood that other forms might be adopted, all coming within the scope of the claims which follow.

What is claimed is as follows:

1. In a servo system for positioning a pivotally mounted controlled member, the combination of: a power section, including means for applying to the controlled member at one side of the pivotal axis a continuous, unidirectional biasing force and at the other side of the pivotal axis a modulated control force in opposition to said biasing force; positive control means for said power section comprising input and feedback sections; and means for applying continuous, unidirectional biasing forces to said input section and to said feedback section, whereby control may be effected throughout the full range by change in net forces in each section but without change in direction of individual forces, thus minimizing lost motion.

2. In a servo control for a fluid pressure energy translating device having a pivotally mounted controlled member shiftable to vary the displacement of the device, said member being subjected to thrust loading having a major thrust component in one direction, the combination of: a power section, including means for applying to the controlled member at one side of the pivotal axis a continuous, unidirectional biasing force and at the other side of the pivotal axis a modulated control force in opposition to said biasing force, said biasing force and said control force having major components parallel to said major thrust component and in the same direction; positive control means for said power section comprising input and feedback sections; and means for applying continuous, unidirectional biasing forces to said input section and to said feedback section, whereby control may be effected throughout the full range by change in net forces in each section but without change in direction of individual forces, thus minimizing lost motion.

References Cited in the file of this patent

UNITED STATES PATENTS

| | | |
|---|---|---|
| 882,887 | Hoxie | Mar. 24, 1908 |
| 1,476,703 | Forman | Dec. 11, 1923 |
| 2,363,179 | Harrington | Nov. 21, 1944 |
| 2,373,724 | Wahlmark | Apr. 17, 1945 |
| 2,404,512 | May | July 23, 1946 |
| 2,456,211 | Nardone | Dec. 14, 1948 |
| 2,682,749 | Pinsenschaum | July 6, 1954 |

FOREIGN PATENTS

| | | |
|---|---|---|
| 344,037 | Great Britain | Mar. 2, 1937 |